UNITED STATES PATENT OFFICE.

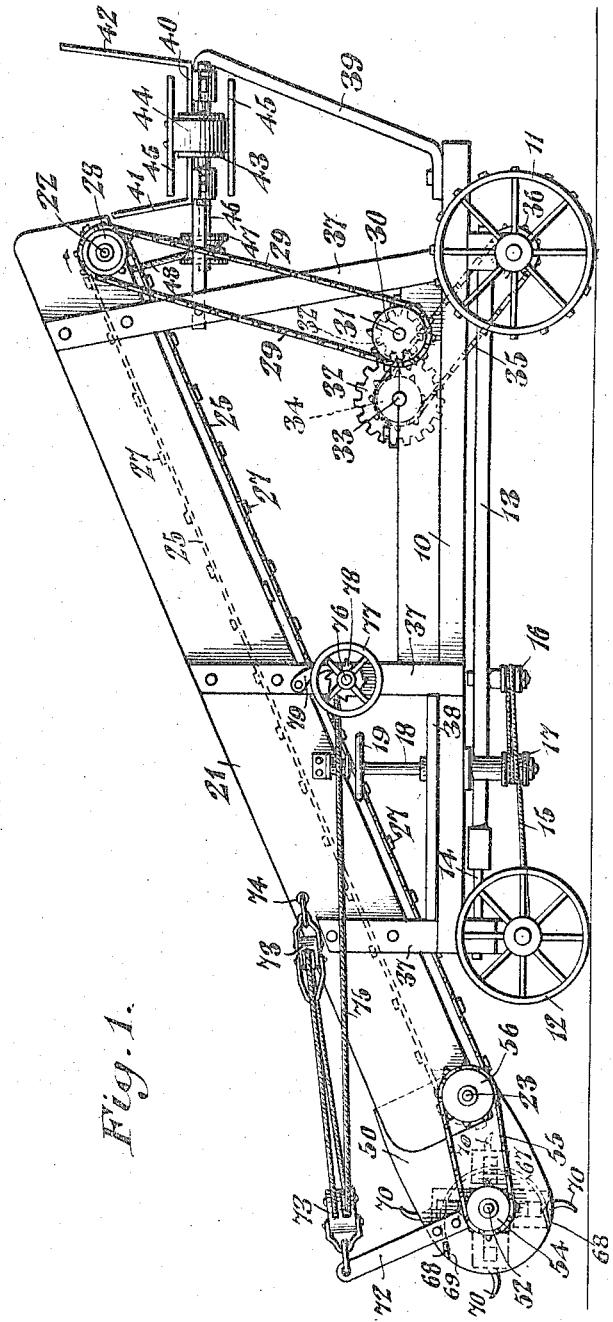

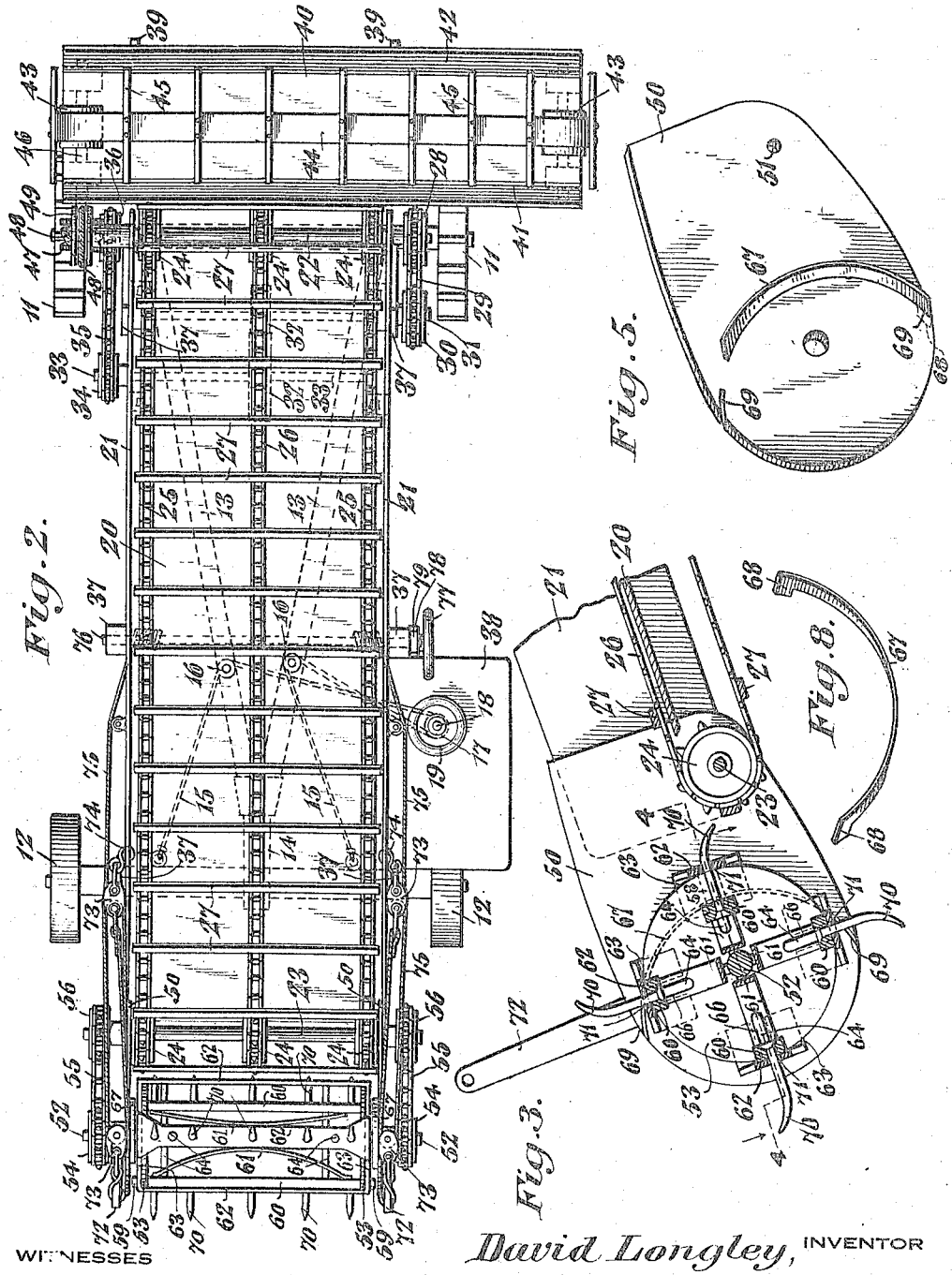

DAVID LONGLEY, OF BAYFIELD, WISCONSIN.

TRACTION BUNDLE-LOADER.

1,248,514.      Specification of Letters Patent.      Patented Dec. 4, 1917.

Application filed June 1, 1916. Serial No. 101,174.

*To all whom it may concern:*

Be it known that I, DAVID LONGLEY, a citizen of the United States, residing at Bayfield, in the county of Bayfield and State of Wisconsin, have invented a new and useful Traction Bundle-Loader, of which the following is a specification.

The present invention relates to an improved loader for hay, grain, and the like, adapted particularly for picking up hay or grain in bundles or shocks, elevating the same, and conveying the hay or grain to and depositing it in the desired vehicle or receptacle.

An object of the invention is to provide an improved construction of loader of this character which comprises but few parts, which may be economically manufactured, and which is of such construction that it may be easily and economically controlled or operated.

A further object of this invention is to provide a loader of this character with a picker frame at its forward end which is adjustable, and which is provided with an improved picking cylinder in which are peculiarly arranged a plurality of picker teeth, and which is provided with an improved means for retracting the teeth as they approach the elevator side of the picking cylinder.

Various other objects and advantages of this invention will be brought out in the following specific disclosure of the present preferred embodiment, the same being illustrated in the accompanying drawings, wherein Figure 1 is a side elevation of a loading machine constructed according to this invention.

Fig. 2 is a top plan view of the same.

Fig. 3 is a detail enlarged section, taken longitudinally through the lower end of the elevator and through the picking cylinder, showing the picker teeth retracted at the side adjacent the elevator.

Fig. 4 is a detail enlarged sectional view, taken longitudinally through the picking cylinder, on the line 4—4 of Fig. 3.

Fig. 5 is a detail enlarged perspective view of one side of the picking frame, showing one of the retracting springs which is broken away at one end to disclose the slot in the frame for receiving the end of the spring.

Fig. 6 is a detail enlarged perspective view of one of the guide bars of the picking cylinder.

Fig. 7 is a detail enlarged perspective view of one of the picker staffs which carry the picker teeth.

Fig. 8 is a detail perspective view on an enlarged scale of one of the retracting springs which are arranged opposite to the lower end of the elevator.

Referring to these drawings, wherein like parts are designated by similar numerals of reference throughout the several views, 10 designates a frame of any suitable construction which is supported at its rear end upon traction wheels 11, and at its forward end upon guide wheels 12. The frame 10 is reinforced at its under side by hounds 13 which extend from the rear axle of the frame to substantially the front axle thereof, and are supported at their forward ends upon a reach 14 or the like, in any suitable manner.

The front axle of the frame 10 has secured to the opposite ends thereof the opposite extremities of a steering rope 15, which preferably passes rearwardly over pulleys 16 and is wound at its intermediate portion about a spool or drum 17 secured to the lower end of a steering post 18 provided with a hand wheel 19.

The frame 10 is provided with a forwardly inclined elevator in the form of a trough or chute having a bottom 20 and upstanding sides 21 at the opposite edges of the bottom extending from end to end thereof. A shaft 22 is journaled in the upper ends of the sides 21, and a shaft 23 is journaled in the lower ends of the sides 21. The shafts 22 and 23 lie substantially in the inclined plane of the bottom 20 and are provided between the sides 21 with registering end and intermediate sprocket wheels 24. These sprocket wheels 24 carry lateral chains 25 and an intermediate chain 26, the same supporting transversely extending slats or bars 27 which, together with the chains, constitute an apron or belt for the elevator. As shown to advantage in Figs. 1 and 3, the upper leg or portion of the endless belt extends in slightly spaced relation above the bottom 20, while the lower leg of the endless belt hangs beneath the bottom.

The elevator belt or apron is adapted to be driven to carry its upper leg upwardly over the bottom 20, and for this purpose the shaft 22 is provided with a sprocket wheel 28 upon preferably its left end and outside of the chute or trough, as shown in Fig. 1. A chain 29 passes over the sprocket wheel 28 and over a second sprocket wheel 30, which is mounted on a counter shaft 31 journaled transversely in the rear end of the frame 10. The shaft 31 is connected by intermeshing gears 32 to a second counter shaft 33, which is also transversely journaled in the frame forwardly of the shaft 31. A sprocket wheel 34 is secured to the second counter shaft 33 and receives thereover a drive chain 35, which passes over a drive sprocket wheel 36 secured to the rear axle of the vehicle. Thus, the movement of the vehicle or frame 10 turns the rear axle and the counter shaft 32 in an anticlockwise direction, and drives the counter shaft 31 and the upper shaft 32 in a clockwise direction, so as to feed the elevator belt in a direction to raise material placed in the lower end of the chute or trough.

Suitable standards 37 rise from the frame 10 at different points throughout the length thereof to support the elevator. A laterally extending platform 38 is arranged at one side of the frame about the steering post 18, and is adapted to accommodate the operator for controlling the movements and adjustments of the loader.

A pair of angle brackets 39 are secured at one end to the rear extremity of the frame 10 and are secured at their opposite ends to the rear standards 37, the angle brackets being so arranged as to dispose an arm of each in substantially a horizontal plane to support a conveyer, as shown in Figs. 1 and 2. This conveyer preferably comprises a trough 40 extending transversely across the rear end of the loader and being supported on said bracket arms 39. The trough 40 is provided preferably with a relatively low front wall 41, which is inclined forwardly into a position beneath the rear end of the elevator, so as to receive hay therefrom and direct the hay into the trough 40. The rear wall 42 of the conveyer is relatively high, so as to prevent the falling rearwardly of the material from the elevator and from the conveyer. The conveyer 40 is provided in each end with a roller 43, over which passes a belt 44 provided with a number of transverse slats or bars 45, which are of a length slightly less than the width of the trough 40, and which are adapted to pass through the trough in one direction and beneath the trough in the opposite direction. One of the rollers 43 is fixed to a transverse shaft 46 journaled preferably in right end of the trough 40, and which has a forwardly projecting part upon which is mounted a pulley 47, receiving thereover a cable 48, which passes upwardly and over a second pulley 49 fixed upon the upper shaft 22 of the elevator. Thus, the turning of the shaft 22 operates the transversely extending conveyer 40 so as to actuate the conveyer belt and move the bundles of hay deposited on the belt to one side of the loader.

A picking means is arranged upon the forward end of the loader, and comprises a pair of vertical flat sides 50, which, as shown in Fig. 5 particularly, have openings 51 to receive therethrough the opposite outer ends of the lower elevator shaft 23, to hingedly connect the sides 50 to the elevator. The sides 50 are arranged preferably against the inner faces of the opposite sides 21 of the elevator, and are adapted to swing in a vertical plane upon the lower end of the elevator. The outer ends of the sides 50 are preferably rounded as shown, and are connected together by means of a picker cylinder. The picker cylinder is provided with a supporting shaft 52 journaled at its opposite ends in the sides 50, as shown to advantage in Fig. 4, and provided with spaced apart heads or disks 53 which are spaced inwardly from the opposite inner faces of the sides 50.

The shaft 52 is provided, preferably on each end, with a sprocket wheel 54, receiving thereover chains 55, which also pass over sprockets 56, secured upon the opposite outer ends of the lower shaft 23 of the elevator. Turning of the shaft 23 thus drives the picking cylinder shaft 52. As will be seen from Fig. 4, the shaft 52 is provided near its opposite ends with outwardly facing shoulders 57, against which the disks or heads 53 rest to hold the heads in position. The heads 53 are provided with registering radial slots 58, which provide guides for the reception of the opposite reduced extensions 59 of picker staffs 60, which are arranged between the heads 53 and adapted for radial movement toward and from the shaft 52.

Leaf springs 61 are bowed, and have their intermediate portions bearing against the shaft 52 midway between its ends, and have their free ends rolled slightly and bearing against the inner sides of the picker staffs 60 to yieldingly urge the picker staffs outwardly from the shaft 52. The extensions 59 of the picker staffs 60 guide the same in their radial movement, and guide bars 62, secured at their opposite ends to the heads 53 in alinement with the slots 58, limit the outward movement of the picker staffs 60. These guide bars 62, one of which is shown in detail in Fig. 6, are preferably provided on their opposite ends with inturned spaced apart fingers 63 adapted to lap over against the outer faces of the heads 53 at the opposite sides of the slots 58. Thus, the fingers 63 do not interfere with the outward movement of the picker staffs 60, but serve as reinforcements for the edges of the slots 58 to take up the wear of the extensions 59.

It will be noted from Figs. 3 and 4, that the guide bars 62 are arranged in diametrically opposed positions, and are held against the peripheries of the heads 53 by diametrically extending rods 64, which pass at different points through the shaft 52. The outer ends of the rods 64 are preferably headed and counter-sunk in the outer faces of the guide bars 62, so as to hold the same firmly in place. The picker staffs 60 are provided with openings 65, through which the rods 64 project to hold the picker staffs firmly in position and assist in guiding the same in their radial movements. The springs 61 are preferably forked or slotted at their outer ends, as at 66, to receive the opposite ends of the rods 64 therethrough, and to admit of the free play of the springs without binding against the rods. These slots 66 also provide, at their opposite sides, bearings or guides to retain the springs 61 in position against the picker staffs 60.

The sides 50 are provided upon their inner faces with arcuate springs 67, as shown to advantage in Figs. 5 and 8. From Figs. 3 and 4, it will be noted that a spring 67 is located between each side 50 and the adjacent head 53, and that the springs 67 lie in the paths of the extensions 59 of the picker staffs 60. The springs 67 have on their opposite ends laterally extending lips 68, engaging in slots 69 formed at an angle in the upper and lower edges of the sides 50, the slots 69 inclining toward the elevator. The lips 68 support the springs 67 in position. The springs 67 are curved on the arc of a circle, whose radius is greater than that of the picking cylinder, and the inner curved faces of the springs 67 provide cams as their intermediate portions are disposed in proximity to the shaft 52, while the opposite ends of the springs gradually flare away from the shaft toward the upper and lower edges of the sides 50.

The extensions 59 of the picker staffs 60 project beyond the heads 53, as shown in Fig. 4, and turn in the path of the springs 67, so that as the cylinder is rotated, the extensions 59 are brought into engagement with the springs 67, and are thus gradually and yieldingly moved inwardly toward the shaft 52 to retract the picker staffs 60 as they approach the lower end of the elevator. This gradual retraction of the picker staffs prevents jar and injury to the parts of the picking cylinder during the operation of the machine, this being particularly so as the members 67 are of a spring or yielding nature. It will also be noted that after the picker staffs have passed the lower end of the elevator, they are only gradually released, for the lower ends of the springs 67 also flare gradually away from the axis of the picking cylinder.

As shown in Fig. 7 particularly, each picker staff 60 is provided with a plurality of picker teeth 70, which are secured thereto and are adapted for movement therewith. These teeth 70 project through guide openings 71 formed in the guide bars 62 in registry with the teeth. The picking cylinder is adapted to turn in a clock wise direction, looking at Fig. 1, and the outer ends of the teeth are preferably curved in the direction of rotation, so as to engage in the bundles and lift the same in the manner of a fork, and allow the bundles to fall from the end of the picker teeth at the inner side of the cylinder.

Each side 50 is provided with an upstanding post 72 to which is connected one end of a block and tackle 73. The opposite end of the block and tackle is attached to the side 21 of the elevator at a point 74, which is spaced upwardly from the lower end of the elevator and substantially in horizontal alinement with the upper extremity of the post 72. A block and tackle 73 is disposed at each side of the machine, the ends 75 of the cables of the block and tackle passing rearwardly and being wound upon an adjusting shaft 76 journaled transversely in a pair of standards 37, which rise from an intermediate portion of the frame 10. A hand wheel 77 is placed upon the extremity of the shaft 76 adjacent the platform 38, so that the shaft 76 may be turned as desired to raise and lower the picking frame. A toothed wheel 78 is mounted on the shaft 76 and is adapted to be engaged by a pawl 79 to lock the shaft 76 from turning when adjusted.

The picking cylinder is arranged closely against the lower end of the elevator, so that the elevator may take up the bundles as they are delivered from the picker teeth 70, and the bundles will not be broken or allowed to fall downwardly between the cylinder and the elevator. The gradual retraction of the picker teeth withdraws the teeth from the bundles so as to release the same, and allow the bundles to fall freely upon the endless belt of the elevator, so that the latter may carry the bundles upwardly and deposit them into the transverse conveyer at the rear end of the machine.

The arcuate springs or cams 67 are secured only at their opposite ends, and their intermediate portions are permitted to yield to some extent and cushion the impact of the picker staffs thereagainst.

The conveyer 40 is adapted to deliver the elevated bundles from one side of the machine to a vehicle or receptacle provided for catching the bundles, and the direction of travel of the conveyer belt 44 depends upon the positioning of the cable 48 over the pulleys 47 and 49, the present drawings showing the belt 44 connected to deliver the bundles from the left side of the machine.

By the peculiar arrangement of the sprockets, chains, and other gearing members above described, the traction wheels 11 are caused to drive the elevator, the conveyer, and the picking cylinder simultaneously and with relatively little friction.

What is claimed is:—

1. A bundle loader including a main frame, a forwardly inclined elevator on the main frame, a vertically adjustable picker frame mounted upon the lower forward end of the elevator, a cylinder mounted in the picker frame and arranged to traverse the lower forward end of the elevator and lying in close proximity thereto, a plurality of picker teeth radially movable in the cylinder, springs in the cylinder connected to the teeth to normally urge the same outwardly to project beyond the cylinder, and resilient cams carried by the picker frame for engagement with said teeth to retract the teeth at the inner side of the cylinder and permit the teeth to clear the forward end of the elevator.

2. A bundle loader including a main frame and an inclined elevator, a picker frame mounted at the lower end of said elevator, a cylinder rotatably mounted in said picker frame and arranged to traverse the lower end of said elevator, a plurality of staffs provided with teeth and movably mounted on said cylinder, springs tending to project said teeth beyond the periphery of said cylinder, and resilient cams mounted on said picker frame and arranged to engage said staffs as they approach the elevator to move the teeth to clear the elevator.

3. A bundle loader including a frame, a cylinder mounted in the frame and having peripherally spaced apart guide bars, picker staffs radially movable in the cylinder and having picker teeth projecting outwardly through said guide bars, said picker staffs having extensions upon their opposite ends projecting from the cylinder, arcuate springs secured at their opposite ends to said frame adjacent the ends of the cylinder and at one side thereof, said extensions of the picker staffs being adapted for engagement with said arcuate springs upon the turning of the cylinder to gradually force said picker staffs inwardly and retract said teeth into the same, and springs within the cylinder engaging the picker staffs to force the same outwardly and project the picker teeth when the extensions are released from said arcuate springs.

4. In a bundle loader, a frame, a cylinder mounted on the frame, picker staffs radially movable in the cylinder and having outwardly extending teeth, springs in the cylinder engaging the picker staffs to normally urge the same outwardly and project the teeth beyond the periphery of the cylinder, and resilient cams carried upon the frame at one side of the cylinder for yielding engagement with said picker staffs to cushion the impact of the same therewith and to retract the picker staffs and the picker teeth at said side of the cylinder.

5. In a bundle loader, a frame, an inclined rotatable elevator on the frame, a picker cylinder mounted entirely beyond the lower end of the elevator, rotatable in the same direction therewith and comprising a shaft, heads mounted on the ends of said shaft and provided with radial slots, radially movable picker staffs having teeth, slidably mounted in said slots and having ends projecting beyond the heads, means for retaining said staffs in said slots, and springs mounted on said cylinder and engaging said staffs to project the teeth normally outwardly, and resilient cams mounted on the frame at the ends of the cylinder on the side thereof adjacent to the elevator and adapted to engage the ends of the staffs and retract the same against the tension of said springs and move the picker teeth inwardly to clear the elevator.

6. In a bundle loader, a frame, an inclined rotatable elevator on the frame, a picker cylinder mounted entirely beyond the lower end of said elevator, rotatable in the same direction therewith and comprising a shaft, heads mounted on the shaft and provided with radially extending slots, radially movable picker staffs having teeth, slidably mounted in said slots and having ends projecting beyond the heads, means for retaining said staffs in said slots, and springs mounted upon said cylinder and adapted to normally project said teeth beyond the periphery thereof, and arcuate-shaped springs forming resilient cams mounted upon the frame at each side of the cylinder and curving from a point in line with the uppermost portion of the cylinder downwardly toward the elevator but inwardly of the side of the cylinder adjacent to said elevator and then downwardly to a point in line with the lowermost portion of the cylinder, whereby for substantially one-half of their revolution said staffs are being retracted, the maximum retraction taking place when the teeth are adjacent to the elevator.

7. In a bundle loader, a frame, an inclined elevator on the frame, a picker frame at the lower end of the elevator, a picker cylinder mounted for rotation in the picker frame and comprising a plurality of circumferentially spaced apart guide bars having guide openings therein, a central supporting shaft and heads provided with radial slots, radially movable picker staffs arranged in said slots below said guide bars and provided with teeth projecting through the openings through said bars, rods connecting diametrically opposed guide bars and extending through said staffs and shaft, leaf springs interposed between said staffs and said central shaft, retained in position by said rods, and tending to keep said pins projected beyond the periphery of said cylinder, and means for retracting said teeth against the tension of said springs as the teeth pass the lower end of the elevator.

8. In a bundle loader, elevator means, side members pivotally supported at the receiving end of the elevator means, a picker cylinder rotatably journaled in the side members and comprising a shaft, heads mounted on the ends of the shaft, radially movable picker staffs having teeth slidably supported within the cylinder, resilient means confined within the cylinder and working against the staffs to project the teeth normally outwardly of said cylinder, and resilient cams carried by the side members and active upon the staffs to retract the same against the tension of said resilient means for moving the teeth inwardly to clear the elevator means.

9. In a bundle loader, elevator means, side members pivotally supported at the receiving end of the elevator means, a picker cylinder rotatably journaled in the side members and comprising a shaft, heads mounted on the ends of the shaft, radially movable picker staffs having teeth slidably supported within the cylinder, resilient means confined within the cylinder and working against the staffs to project the teeth normally outwardly of said cylinder, resilient cams carried by the side members and active upon the staffs to retract the same against the tension of said resilient means for moving the teeth inwardly to clear the elevator means, and means for raising and lowering the side members relative to the elevator means.

In testimony, that I claim the foregoing as my own, I have hereto affixed my signature in the presence of two witnesses.

DAVID LONGLEY.

Witnesses:
  IDA HANSON,
  C. H. LINDGREN.

Copies of this patent may be obtained for five cents each, by addressing the "Commissioner of Patents, Washington, D. C."